US012577635B2

(12) United States Patent
Li et al.

(10) Patent No.: US 12,577,635 B2
(45) Date of Patent: Mar. 17, 2026

(54) METHOD FOR EXTRACTING AND RECOVERING GOLD FROM AQUEOUS SOLUTION

(71) Applicant: CHINA UNIVERSITY OF MINING AND TECHNOLOGY, Xuzhou City (CN)

(72) Inventors: Peng Li, Xuzhou City (CN); Chenlong Duan, Xuzhou City (CN); Guofu Dai, Xuzhou City (CN)

(73) Assignee: China University of Mining and Technology, Xuzhou City (CN)

( * ) Notice: Subject to any disclaimer, the term of this patent is extended or adjusted under 35 U.S.C. 154(b) by 383 days.

(21) Appl. No.: 18/022,571

(22) PCT Filed: Oct. 31, 2022

(86) PCT No.: PCT/CN2022/128743
§ 371 (c)(1),
(2) Date: Feb. 22, 2023

(87) PCT Pub. No.: WO2024/000970
PCT Pub. Date: Jan. 4, 2024

(65) Prior Publication Data
US 2023/0416871 A1 Dec. 28, 2023

(51) Int. Cl.
| | |
|---|---|
| *C22B 11/00* | (2006.01) |
| *B01D 61/02* | (2006.01) |
| *B01D 69/02* | (2006.01) |
| *C23G 1/08* | (2006.01) |
| *C25C 1/20* | (2006.01) |

(52) U.S. Cl.
CPC ............ *C22B 11/04* (2013.01); *B01D 61/027* (2013.01); *B01D 69/02* (2013.01); *C23G 1/085* (2013.01); *C25C 1/20* (2013.01); *B01D 2325/0283* (2022.08)

(58) Field of Classification Search
None
See application file for complete search history.

(56) References Cited

U.S. PATENT DOCUMENTS

| | | | |
|---|---|---|---|
| 2012/0298523 A1 | 11/2012 | Nieminen | |
| 2014/0116886 A1 | 5/2014 | Barboy | |
| 2018/0119250 A1 | 5/2018 | Zhou | |

FOREIGN PATENT DOCUMENTS

| | | | |
|---|---|---|---|
| CN | 1342786 A | * | 4/2002 |
| CN | 107699702 A | | 2/2018 |
| CN | 109336302 A | | 2/2019 |
| CN | 110482808 A | | 11/2019 |
| CN | 114941076 A | | 6/2023 |
| JP | 2001192745 A | | 7/2001 |
| JP | 2012158830 A | | 8/2012 |
| RU | 2652983 C1 | | 5/2018 |

OTHER PUBLICATIONS

Written Opinion of the International Searching Authority of PCTCN2022128743.
OA1 of priority document of CN202210754370.
International Search Report of PCTCN2022128743.
English Abstract of cited patent documents.

* cited by examiner

*Primary Examiner* — Anthony M Liang
(74) *Attorney, Agent, or Firm* — Artie Pennington Law Offices, PLC; Artie Pennington; Hannah Ward

(57) ABSTRACT

The present disclosure provides a method for extracting and recovering gold from an aqueous solution, the method including: (1) gold extraction from an aqueous solution through electrocoagulation, in which an electrocoagulation reaction is performed in an electrolytic cell to produce iron hydroxide in-situ, so as to capture gold in the aqueous solution and reduces the gold into gold nanoparticles in-situ; (2) pickling and liquefaction of the precipitated iron sludge, in which the obtained precipitate is dissolved in nitric acid to dissolve iron flocs after washing treatment; and (3) separation and recovery of gold through a nanofiltration membrane system, in which the resulting solution after pickling the precipitated iron sludge is subjected to cut-off treatment using a nanofiltration membrane to separate nano-sized elemental gold from the solution, and then the resultant is washed with water to obtain elemental gold.

20 Claims, 8 Drawing Sheets

METHOD FOR EXTRACTING AND RECOVERING GOLD FROM AQUEOUS SOLUTION

CROSS-REFERENCES TO RELATED APPLICATIONS

This application is the U.S. National Stage of PCT Application No. PCT/CN2022/128743, filed 31 Oct. 2022, which in turn claims priority to Chinese Patent Application No. CN202210754370.9, entitled "Method for Extracting and Recovering Gold from Aqueous Solution" filed with Chinese Patent Office on Jun. 28, 2022, each of which is incorporated herein by reference in its entirety.

TECHNICAL FIELD

The present disclosure relates to the field of hydrometallurgy, and particularly to a method for extracting and recovering gold from an aqueous solution.

BACKGROUND ART

Gold has good physical and chemical stability, electrical conductivity and thermal conductivity, ductility and machinability, and is rare, which is widely used in the fields of aviation, catalysis, medical treatment, electronics, and finance. With the continuous development of society, the gold demand is increasing daily, gold reserves in the earth's crust and the existing exploitation quantity of gold are difficult to meet the gold demand for social development. Extraction and recovery of gold from low-concentration and multi-component environmental media such as low-grade/low-quality gold ores, gold tailings, and urban electronic waste is drawing more and more attention of environmental protection and scientific and technological workers in various countries. The development of a method of extraction and recovery of gold from low-concentration and multi-component aqueous solution is a critical technical problem to be solved urgently.

Regarding existing processes of extraction and recovery of gold, the processes for recovering gold from a gold-containing solution mainly include zinc powder replacement, adsorption, electrodeposition, and solvent extraction processes. The zinc powder replacement process is a relatively mature and widely used gold recovery method, has the advantages of simple equipment, easy operation and no power consumption, and is currently one of the main means for gold recovery by various gold producing enterprises. This process, however, has a low gold recovery rate (about 97.0%), and is thus not suitable for solutions with a low gold concentration (this method is usually applied for gold recovery from a solution with a high gold concentration after flotation). In addition, there are problems of treatment of zinc-containing wastewater and subsequent gold separation. The adsorption process does not require solid-liquid separation, washing and clarification processes, and can save a large amount of equipment investment and production operation costs as compared with those of the zinc powder replacement process. The adsorbents commonly used for gold enrichment and recovery include activated carbon and ion exchange resins. The activated carbon adsorbent has the problems of low adsorption capacity, poor selectivity and low regeneration and recovery efficiencies. The ion exchange resins (which are mostly alkaline anion exchange resins) lead to a high cost of gold recovery, a complex regeneration process, and further reduction processing in the subsequent step. The electrodeposition process in a dilute solution has a low current efficiency, and gold extraction through electrodeposition is mainly used for treating a gold-containing solution with a relatively high gold concentration. The solvent extraction process has only few indirect applications based on gold extraction, such as concentration and enrichment of gold, which is mainly used as a pre-enrichment means. Due to the lack of a high-efficiency gold extraction solvent used for gold extraction from an alkaline cyanide solution and having a relatively small loss of the extraction solvent, and a large-scale industrial application of the solvent extraction for the gold-containing aqueous solution has a relatively slow progress.

In views of the above, currently, a method of extraction and recovery of gold from an aqueous solution, which has high gold extraction efficiency, low cost, simple technological process, good stability, and environmental protection, is on urgent demand in this industry.

SUMMARY

The present disclosure provides a method for extracting and recovering gold from an aqueous solution, the method including: (1) gold extraction from an aqueous solution through electrocoagulation, including: extracting gold from an aqueous solution through electrocoagulation using a sodium salt as an electrolyte under a direct-current stabilized voltage supply in an electrolytic cell; (2) pickling and liquefaction of the precipitated iron sludge, including: dissolving the resulting precipitate in nitric acid under ultrasonication treatment; and (3) separation and recovery of gold through a nanofiltration membrane system, including: subjecting the resulting solution after pickling the precipitated iron sludge to cut-off treatment using a nanofiltration membrane to separate nano-sized elemental gold from the solution.

The present disclosure provides a method for extracting and recovering gold, the method including: (1) performing gold extraction through an electrocoagulation reaction in an aqueous solution containing gold using an electrolytic cell and an electrolyte under a direct-current stabilized voltage supply, to obtain a precipitate; (2) performing acid hydrolysis on the resulting precipitate in an acid to obtain a solution after pickling; and (3) filtering and cutting off the solution after pickling to separate nano-sized elemental gold from the solution.

Optionally, the electrolytic cell in step (1) includes an anode and a cathode, and the anode is made of an anode material that can dissolve to release metal ions and produce electropositive colloidal oxides or hydroxides. Optionally, the anode is made of a positive trivalent metal anode material. Optionally, the anode is an iron sheet. Optionally, the electrolytic cell in step (1) includes an anode and a cathode; the anode is an iron sheet, which undergoes an electrocoagulation reaction to generate an iron hydroxide so as to achieve capture and reduction of gold; and the cathode is selected from any one of titanium plates, graphite, stainless steel, and copper sheets.

Optionally, the anode in step (1) is an iron sheet, which undergoes an electrocoagulation reaction to generate an iron hydroxide so as to achieve capture and reduction of gold; and the cathode in step (1) is selected from any one of titanium plates, graphite, stainless steel, and copper sheets. Optionally, the electrolyte is selected from any one of sodium salts, magnesium salts, calcium salts, and potassium salts.

Optionally, the electrolyte in step (1) is selected from any one of $Na_2SO_4$, NaCl, $NaNO_3$, and $Na_2CO_3$. Optionally, the electrolyte is $Na_2SO_4$, and the mass concentration of the electrolyte is 3.0%. Optionally, the electrolyte is NaCl, $NaNO_3$, or $Na_2CO_3$, and the mass concentration of the electrolyte is 0.5%-5.0%. Optionally, the applied voltage for the electrolytic cell in step (1) is 0.5V-4.0V. Optionally, the pH range of the aqueous solution in step (1) is 3.0-10.0. Optionally, the acid is an acid with a pH less than 2. Optionally, the concentration of the acid ranges from 1.0 mol/L to 8.0 mol/L.

Optionally, the concentration of the nitric acid in step (2) ranges from 3.0 mol/L to 6.0 mol/L. The solid-liquid ratio of the precipitate and nitric acid is 1:500-1:50. Optionally, step (2) further includes stirring or ultrasonication during the acid hydrolysis. Optionally, the temperature of ultrasonication treatment in step (2) is 50° C.-80° C., and the ultrasonication washing time is 0.5 h or longer. Optionally, in step (3), the cut-off separation of nano-sized gold is carried out using a nanofiltration membrane, and the nanofiltration membrane has a pore size less than 4.0 nm.

DETAILED DESCRIPTION OF THE EMBODIMENTS

Figure 1:
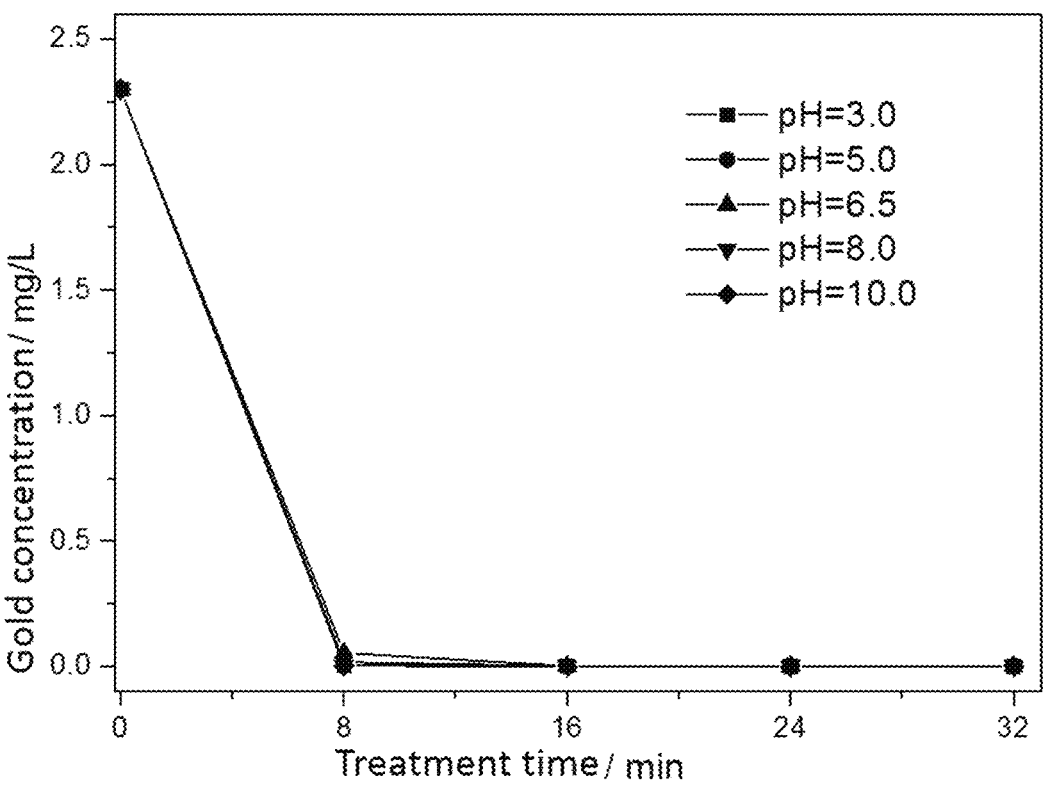
FIG. 1 shows a change in gold concentration as the pH of the aqueous solutions differs in the gold extraction from the aqueous solution through electrocoagulation in the examples.

In order to clarify the objects, technical solutions, and advantages of the present disclosure, the present disclosure will be described in more detail below with reference to the embodiments. It should be understood that the specific embodiments described herein are merely used to illustrate the present disclosure, and are not intended to limit the present disclosure. The modifications or equivalent substitutions made by those skilled in the art based on the understanding of the technical solutions of the present disclosure, without departing from the spirit and scope of the technical solutions of the present disclosure, shall fall within the protection scope of the present disclosure.

In view of the above deficiencies, the present disclosure provides a method for extracting and recovering a metal from an aqueous solution, and aims at solving the problem of low extraction efficiency and high recovery cost in gold extraction and recovery from aqueous solutions containing a low concentration of gold, which are produced by leaching low-grade gold ores, gold tailing slags after heap leaching and electronic waste. In the method, the use of electrocoagulation coupled with a nanofiltration process realizes the efficient extraction and recovery of gold. The extraction efficiency of gold in a liquid phase is as high as 99.99%, and the elemental gold can be directly recovered.

Definition of Terms

As used herein, the term "electronegativity" refers to a magnitude of negative charges carried in an aqueous solution of ions or micelles. An ion or micelle having greater electronegativity means that its potential ion is negatively charged, and it carries more negative charges.

As used herein, the term "electropositivity" refers to a magnitude of positive charges carried in an aqueous solution of ions or micelles. An ion or micelle having greater electropositivity means that its potential ion is positively charged, and it carries more positive charges.

In some embodiments of the present disclosure, provided is a method for extracting and recovering gold from an aqueous solution, the method including: (1) gold extraction from an aqueous solution through electrocoagulation: extracting gold from an aqueous solution through electrocoagulation using a sodium salt as an electrolyte under a direct-current stabilized voltage supply in an electrolytic cell; (2) pickling and liquefaction of the precipitated iron sludge: dissolving the resulting precipitate in nitric acid under ultrasonication treatment; and (3) separation and recovery of gold through a nanofiltration membrane system: subjecting the resulting solution after pickling the precipitated iron sludge to cut-off treatment using a nanofiltration membrane, to separate nano-sized elemental gold from the solution.

In some embodiments of the present disclosure, provided is a method for extracting and recovering gold from a water-based solution, the method including: (1) performing electrocoagulation on the water-based solution using an electrolytic cell an electrolyte under a direct-current stabilized voltage supply, to obtain a precipitate; (2) subjecting the resulting precipitate to acid hydrolysis to obtain a solution after pickling; and (3) subjecting the solution after pickling to cut-off treatment using a nanofiltration membrane, to separate nano-sized elemental gold from the solution.

In some embodiments, the electrolytic cell includes an anode and a cathode. In some embodiments, the anode is made of an anode material that can dissolve to release metal ions and produce electropositive colloidal oxides or hydroxides during an electrolysis process. In some embodiments, the anode is made of a positive trivalent metal anode material. In some embodiments, the anode is an iron or aluminum sheet. In some embodiments, the anode is an iron sheet. In some embodiments, capture and reduction of gold is achieved by electrocoagulation reaction to generate an iron hydroxide.

In some embodiments, the cathode is made of a cathode material that does not dissolve or that the released ions do not bind to and/or react with gold ions during the electrolysis process. In some embodiments, the cathode includes, but is not limited to, any one of titanium plates, graphite, stainless steel, and copper sheets.

In some embodiments, the mass concentration of the electrolyte is 0.5%-5.0%, for example, 1.0%-4.5%, 1.5%-4.0%, or 2.0%-3.5%, such as 0.5%, 1.0%, 1.5%, 2.0%, 2.5%, 3.0%, 3.5%, 4.0%, 4.5%, 5.0%, or an interval value between any two of the above endpoints. In some embodiments, the electrolyte include acids, bases, or salts, soluble in an aqueous medium. In some embodiments, the electrolyte include, but is not limited to, sodium salts, magnesium salts, calcium salts, and potassium salts.

In some embodiments, the electrolyte is selected from any one of $MgSO_4$, $MgCl_2$, $Mg(NO_3)_2$, $MgCO_3$, $CaSO_4$, $CaCl_2$, $Ca(NO_3)_2$, $K_2SO_4$, $KCl$, $KNO_3$ and $K_2CO_3$. In some embodiments, the electrolyte in step (1) is selected from any one of $Na_2SO_4$, $NaCl$, $NaNO_3$, and $Na_2CO_3$. In some embodiments, the electrolyte is $Na_2SO_4$, and the mass concentration of the electrolyte is 3.0%.

In some embodiments, when the electrolyte is $NaCl$, $NaNO_3$, and $Na_2CO_3$, the mass concentration of the electrolyte is 0.5%-5.0%, for example, 1.0%-4.6%, 1.6%-3.9%, or 2.0%-3.0%, such as 0.5%, 1.0%, 1.5%, 2.0%, 2.5%, 3.0%, 3.5%, 4.0%, 4.5%, 5.0%, or an interval value between any two of the above endpoints.

In some embodiments, as long as the voltage range of the electrolytic cell in step (1) is sufficient to realize the electrolysis process, that is, the highly efficient extraction of gold can be realized, the voltage range can be determined by those skilled in the art.

In some embodiments, the voltage applied to the electrolytic cell in step (1) is 0.5V-4.0V, for example, 1.0V-3.5V, 1.5V-3.0V, or 2.0V-2.5V, such as 0.5V, 1.0V, 1.5V, 2.0V, 2.5V, 3.0V, 3.5V, 4.0V, or an interval value between any two of the above endpoints. The research results of the present disclosure show that gold extraction under low voltage conditions can further enhance the selectivity for gold extraction. Specifically, during electrolysis, the positively charged flocculation precursor preferentially binds to the hydrated gold ions that are highly electronegative, which avoids a large number of hydroxyl groups formed under high voltage from directly forming precipitates in the form of hydroxides, with other metal ions (such as copper, nickel, zinc, and lead) in the reaction system, which may thus incorporate more precipitate of impurities in precipitated flocs via electrocoagulation, and then affect the extraction efficiency of gold and increase the difficulty of subsequent processes (such as acid hydrolysis and filtration). Moreover, the low voltage also avoids the dissolution of metal anode material and thus improves the process stability.

The low voltage within the scope of the present disclosure realizes the selectivity of more efficient gold extraction, and improves the gold grade in the precipitated iron sludge after concentration. However, in the present disclosure, a voltage outside the range of can also be selected provided that it is technically feasible, and such a voltage can also achieve a higher gold extraction efficiency than the prior art.

In some embodiments, the pH of the aqueous solution or water-based solution in step (1) ranges from 3.0 to 10.0, for example, 3.5-9.5, 4.5-8.5, or 5.5-8, such as 3.0, 3.5, 4.0, 4.5, 5.0, 6.0, 6.5, 7.0, 7.5, 8.0, 8.5, 9.0, 9.5, 10.0, or an interval value between any two of the above endpoints. The electrolysis reaction of the present disclosure can realize highly efficient extraction of gold in acidic, neutral, or basic environments.

In some embodiments, the acid is an acid with a pH less than 2. In some embodiments, the concentration of the acid ranges from 1.0 mol/L to 8.0 mol/L, for example, 1.5 mol/L-7.5 mol/L, 3.0 mol/L-7.0 mol/L, or 4.0 mol/L-6.5 mol/L, such as 1.0 mol/L, 1.5 mol/L, 2.0 mol/L, 2.5 mol/L, 3.0 mol/L, 3.5 mol/L, 4.0 mol/L, 4.5 mol/L, 5.0 mol/L, 5.5 mol/L, 6.0 mol/L, 7.0 mol/L, 8.0 mol/L, or an interval value between any two of the above endpoints. In some embodiments, the solid-liquid ratio of the precipitate and the acid is 1:500-1:50, and may for example be 50:450-5:45, 60:400-10:40, or 100:300-15:30, such as 1:500, 1:450, 1:400, 1:350, 1:300, 1:250, or an interval value between any two of the above endpoints.

In some embodiments, the acid includes, but is not limited to, sulfuric acid, nitric acid, hydrochloric acid, chloric acid, perchloric acid, selenic acid, and the like. In some embodiments, for the purpose of being environmentally friendly, optionally, the acid is nitric acid.

In some embodiments, the concentration of nitric acid in step (2) ranges from 3.0 mol/L to 6.0 mol/L, for example, 3.5 mol/L-5.5 mol/L, 4.0 mol/L-5.0 mol/L, or 4.2 mol/L-3.8 mol/L, such as 3.0 mol/L, 3.4 mol/L, 3.6 mol/L, 3.8 mol/L, 4.2 mol/L, 4.4 mol/L, 4.8 mol/L, 5.2 mol/L, 5.8 mol/L, 4.0 mol/L, or an interval value between any two of the above endpoints. The solid-liquid ratio of the precipitate and nitric acid is 1:500-1:50, and may for example be 60:400-10:40 or 100:300-15:30, such as 1:500, 1:450, 1:400, 1:350, 1:300, 1:250, 1:200, 1:150, 1:100, 1:80, 1:60, 1:50, or an interval value between any two of the above endpoints.

In some embodiments, step (2) further includes stirring or ultrasonication during the acid hydrolysis. In some embodiments, the temperature of the ultrasonication treatment in step (2) is 50° C.-80° C., and may for example be 55° C.-75° C., 60° C.-70° C., or 62° C.-68° C., such as 50° C., 52° C., 54° C., 56° C., 58° C., 60° C., 62° C., 64° C., 66° C., 68° C., 70° C., 72° C., 74° C., 76° C., 78° C., 80° C., or an interval value between any two of the above endpoints. In some embodiments, the ultrasonication washing time is 0.5 h or longer and is optionally 0.5 h.

In some embodiments, the stirring speed is 10 rpm-200 rpm, for example, 20 rpm-180 rpm, or 80 rpm-120 rpm, such as 10 rpm, 20 rpm, 40 rpm, 60 rpm, 80 rpm, 140 rpm, 160 rpm, 180 rpm, or 200 rpm, or an interval value between any two of the above endpoints.

In some embodiments, in step (3), the cut-off separation of nano-sized gold is carried out using a nanofiltration membrane, and the nanofiltration membrane has a pore size less than 4.0 nm and optionally 3.0 nm.

The present disclosure utilizes the high electronegativity and easy reduction characteristics of gold and uses electropositive flocculation precursors (iron oxide/hydroxide) to allow efficient affinity with and capture of gold ions in aqueous solution, and perform in-situ reduction and conversion, to obtain elemental gold nanoparticles, such that high-efficiency cut-off and conversion of gold are achieved under low potential conditions. The obtained flocs are washed with high-concentration nitric acid, whereby the other metal ions mixed therein and flocculation precursor during the precipitation of gold via electrocoagulation are transformed into a liquid phase after pickling, where gold is still present as elemental gold nanoparticles. The separation process using a nanofiltration membrane is adopted to cut off the gold element in the washing liquid. This method has the characteristics of high gold extraction efficiency (about 100%), low cost, simple process, high stability, and environmental protection, and also can achieve recovery of high-grade elemental gold (with an overall recovery rate larger than 95%). Thus, this method is of an important significance for technical guidance and practical engineering application for extraction and recovery of gold in various types of gold smelting and extraction processes.

The inventors of the present disclosure have innovatively found that an electrocoagulation system is created using an electric field, so that an electropositive flocculation precursor (that is, a colloidal substance) thus produced can be used to efficiently and selectively extract the hydrated gold ions present in the aqueous solution.

Specifically, the present disclosure utilizes the strong electronegativity of gold ions (order of metal ion electronegativity: Au>Rh>Pd>Pt>Ag>Cu>Ni>Zn>Mn>Mg), to realize the selective cut-off and capture of Au ions by the electropositive flocculation precursor during the electrocoagulation reaction; and then achieves in-situ reduction of gold ions into nano-sized elemental gold, based on the characteristic that gold is difficult to oxidize but easy to reduce (order of metal ion reducing property: Au>Pt>Pd>Ag>Rh>Cu>Ni>Zn>Mn>Mg).

More importantly, the present disclosure unprecedentedly uses an electric field to achieve high-efficiency capture of gold ions and in-situ reduction of gold ions. The use of an electric field promotes the migration of ions, leading to the change of the electric double layer of gold, thereby reducing its potential. Accordingly, the efficient binding of gold ions to the electropositive flocculation precursor is promoted, making gold ions easier to be captured by the electropositive flocculation precursor. Furthermore, in the present disclosure, making use of the reducibility resulting from production of the electropositive flocculation precursor (for example, $Fe^{2+}$ production) in an electric field environment, the gold ions can be effectively reduced in-situ to gold in the nano-sized form, which is in a cluster state and thus more conducive to recovery.

In addition, in the gold extraction through electrocoagulation in the present disclosure, a lower voltage is selected to apply, which effectively avoids the dissolution of the anode metal material (such as iron) in the reaction system, and ensures the stability of the electropositive flocculation precursor formed by the anode metal. This makes it possible to efficiently capture gold ions and avoid the interference of other metal ions on gold extraction, effectively improving the extraction efficiency of gold.

The present disclosure achieves efficient extraction of gold by capturing and precipitating gold ions during in-situ production of flocculation, and then in-situ reduction of gold, which greatly reducing cost of extraction (for example, saving raw material cost for gold extraction).

The resulting flocculent precipitate was washed with a strong acid such as concentrated nitric acid to obtain an acidic washing liquid containing gold, in which gold is present in the form of elemental nanoparticles, and other metals are dissolved in the form of metal ions in water. Then, a nanofiltration membrane system is used to separate the obtained gold component, and thus high-grade elemental gold is obtained. The whole process is highly innovative, has high gold extraction and separation efficiency, low operating cost, and remarkable scientific innovation and engineering feasibility.

EXAMPLE

Examples 1-13

The preparation methods of Examples 1-13 were as follows. A method for extracting and recovering gold from an aqueous solution included the following steps: (1) Gold extraction from aqueous solution through electrocoagulation. An electrolytic cell (with a size of 10 cm×7 cm×3.0 cm and an electrode plate spacing of 3 cm) was used, which includes iron as an anode, a titanium plate as a cathode, and $Na_2SO_4$ with a mass concentration of 3.0% as an electrolyte, with the size of electrodes being 10 cm×7 cm×0.2 cm. A gold ion standard solution (with a product lot number of BWB2232-2016, commercially available from Bena Biological Testing Co., Ltd., Henan, China) was added in the aqueous solution (water-based solution) to prepare a solution with a final concentration of gold ions about 2.0 mg/L (refer to Table 1 for the specific measured concentrations). Gold was extracted from the different aqueous solutions having a pH respectively controlled to 3.0, 5.0, 6.5, 8.0, or 10.0 (for Examples 1-5) in the electrolytic cell under a direct-current stabilized voltage supply with an applied voltage of 2.0V.

A gold ion standard solution (with a product lot number of BWB2232-2016, commercially available from Bena Biological Testing Co., Ltd., Henan, China) was added in the aqueous solution (water-based solution) to prepare aqueous solutions with an initial concentration co of gold about 1.0, 2.0, 4.0, or 8.0 mg/L (refer to Table 1 for the specific measured concentrations). Gold was extracted from the aqueous solutions (water-based solutions) having a pH of 6.5 under an applied voltage of 2.0V (Examples 6-9).

A gold ion standard solution (with a product lot number of BWB2232-2016, commercially available from Bena Biological Testing Co., Ltd., Henan, China) was added in the aqueous solution (water-based solution) to prepare a aqueous solution with a final concentration of gold about 2.0 mg/L (refer to Table 1 for the specific measured concentrations). Gold was extracted from the aqueous solution (water-based solutions) having a pH of 6.5 under different applied bath voltages U of 0.5V, 1.0V, 2.0V, 4.0V (For examples 10-13).

(2) Pickling and liquefaction of the precipitated iron sludge. The obtained precipitate was dissolved in nitric acid with a concentration of 4.0 mol/L at a solid-liquid ratio of 1:100, while ultrasonication washing was performed using an ultrasonic apparatus at 60° C. for 0.5 h. The solution after washing was homogeneous and dark brown.

(3) Separation and recovery of gold through a nanofiltration membrane system. The resulting solution after pickling the precipitated iron sludge was subjected to cut-off treatment using an organic nanofiltration membrane (with pore size about 3.0 nm) to separate nano-sized elemental gold from the solution.

Experimental Example

Experimental example: (1) Determination of extraction efficiency of gold from aqueous solution through electrocoagulation reaction. After gold extraction from the aqueous solution through electrocoagulation in step (1) of each of Examples 1-13 described above, the residual content of gold ions in aqueous solution of the reaction system was determined to characterize the extraction efficiency of gold.

Testing method: Sample pretreatment: the reaction solution of the reaction step (1) of each of Examples 1-13 was sampled and filtered through a 0.22 μm water-based filter membrane, and the filtrate was collected for measurement. The concentration of gold ions in the aqueous solution was measured using a laser ablation-inductively coupled plasma mass spectrometer (LA-ICP-MS, Agilent 7900, Agilent, USA).

Figure 3:
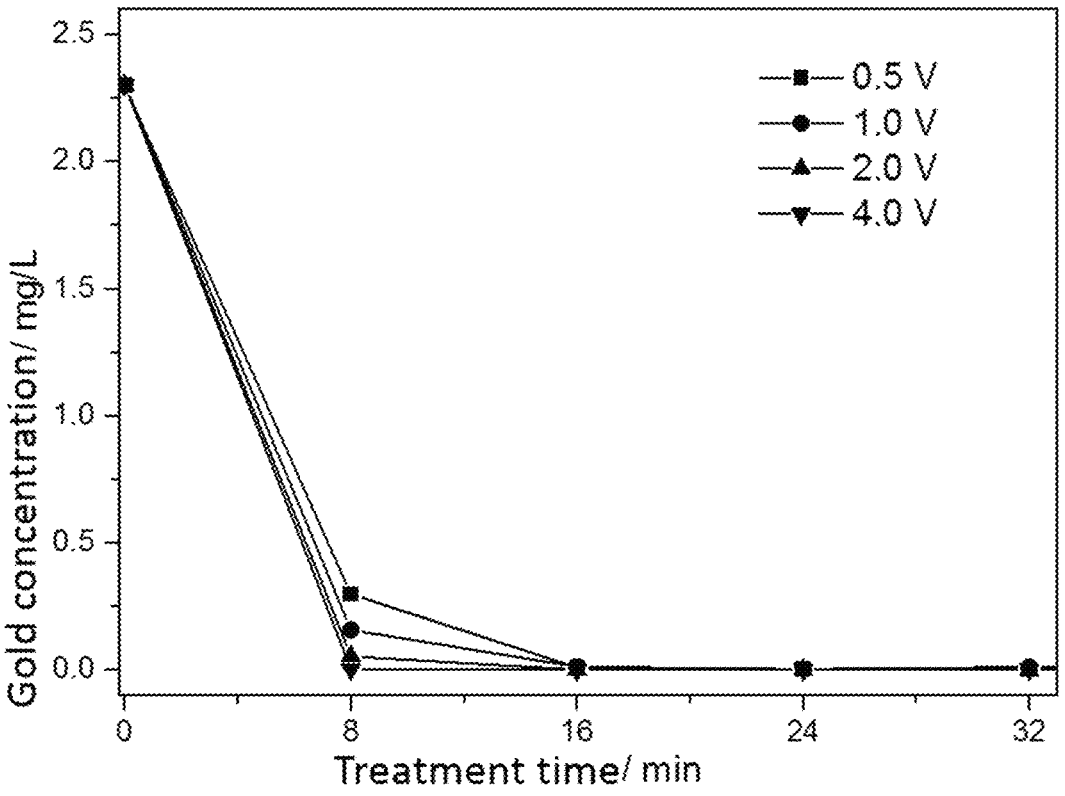
FIG. 3 shows a change in gold concentration as the applied bath voltages differ in the gold extraction from the aqueous solution through electrocoagulation in the examples.
Figure 4A:
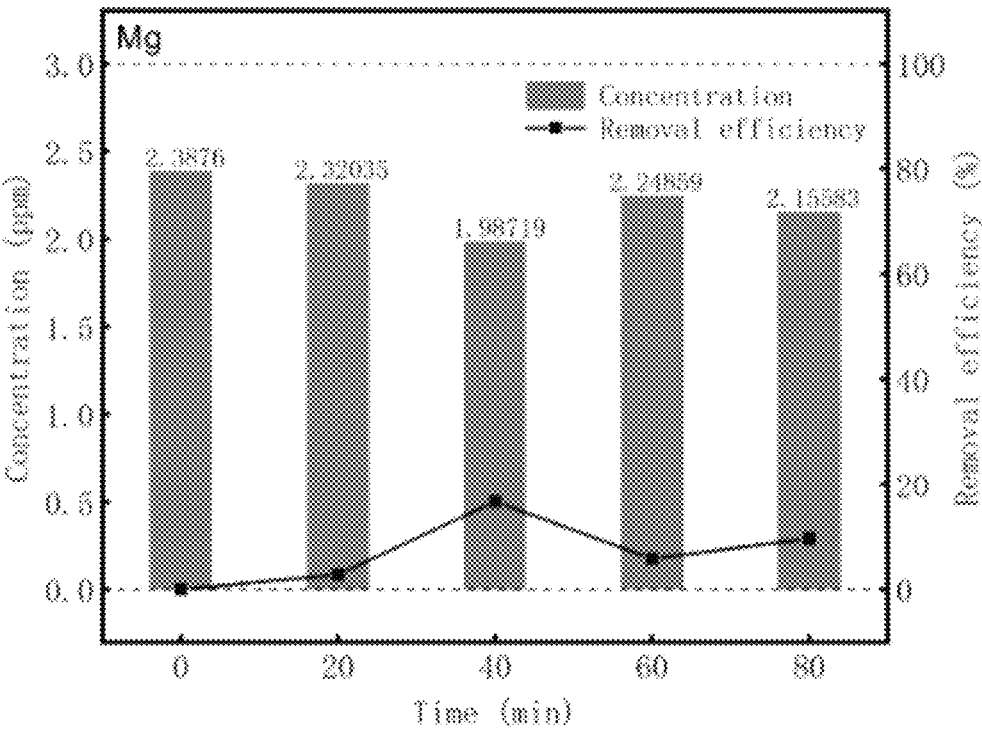
FIG. 4*a* shows a change in concentration of metal ions at different treatment times in the magnesium extraction from the aqueous solution through electrocoagulation in the examples.
Figure 4B:
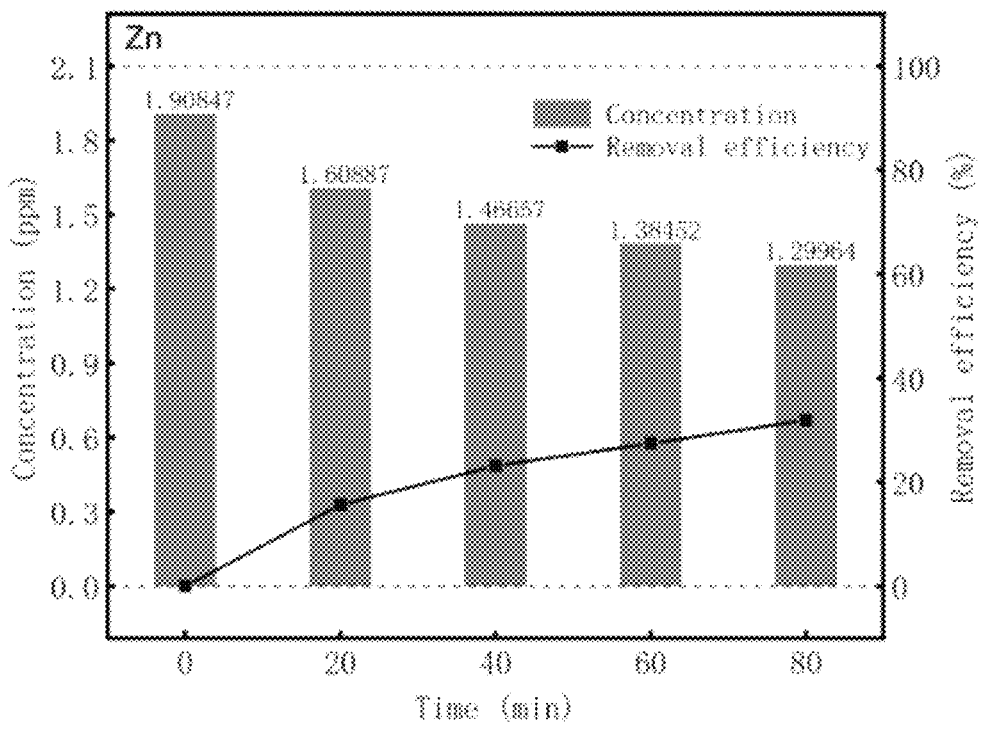
FIG. 4*b* shows a change in concentration of metal ions at different treatment times in the zinc extraction from the aqueous solution through electrocoagulation in the examples.
Figure 4C:
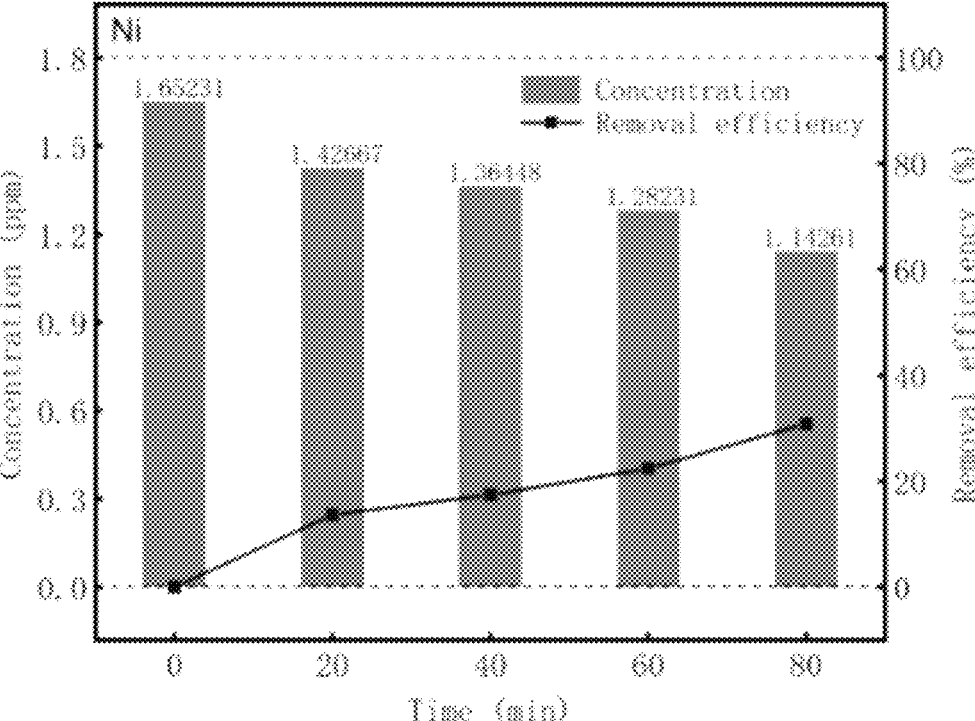
FIG. 4*c* shows a change in concentration of metal ions at different treatment times in the nickel extraction from the aqueous solution through electrocoagulation in the examples.
Figure 4D:
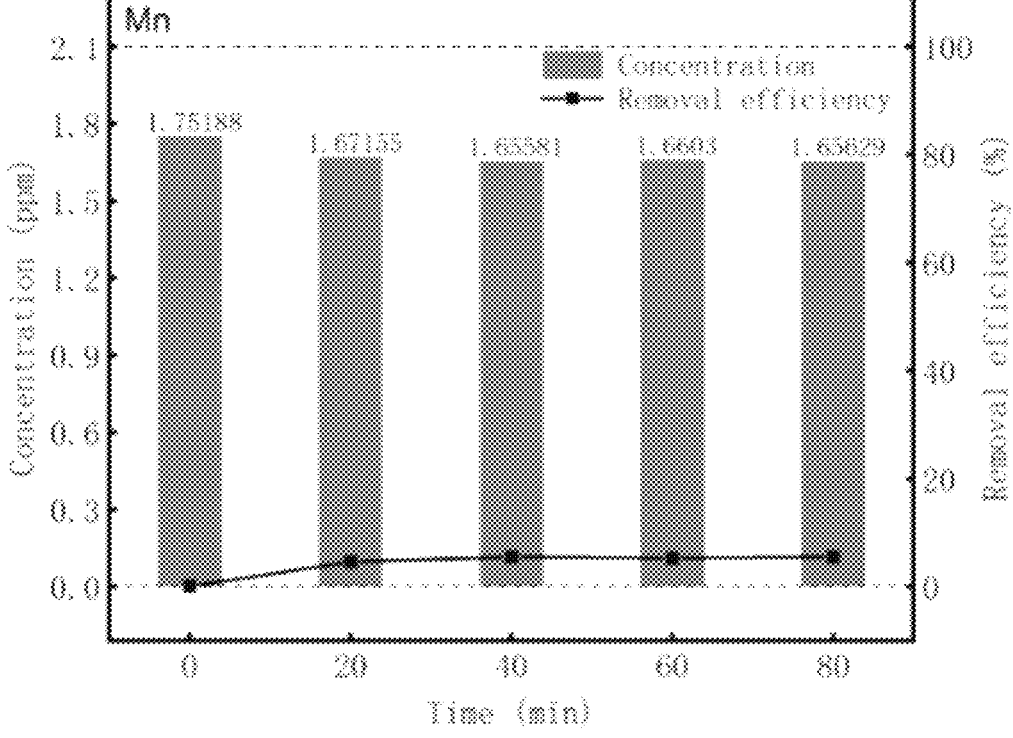
FIG. 4*d* shows a change in concentration of metal ions at different treatment times in the manganese extraction from the aqueous solution through electrocoagulation in the examples.
Figure 4E:
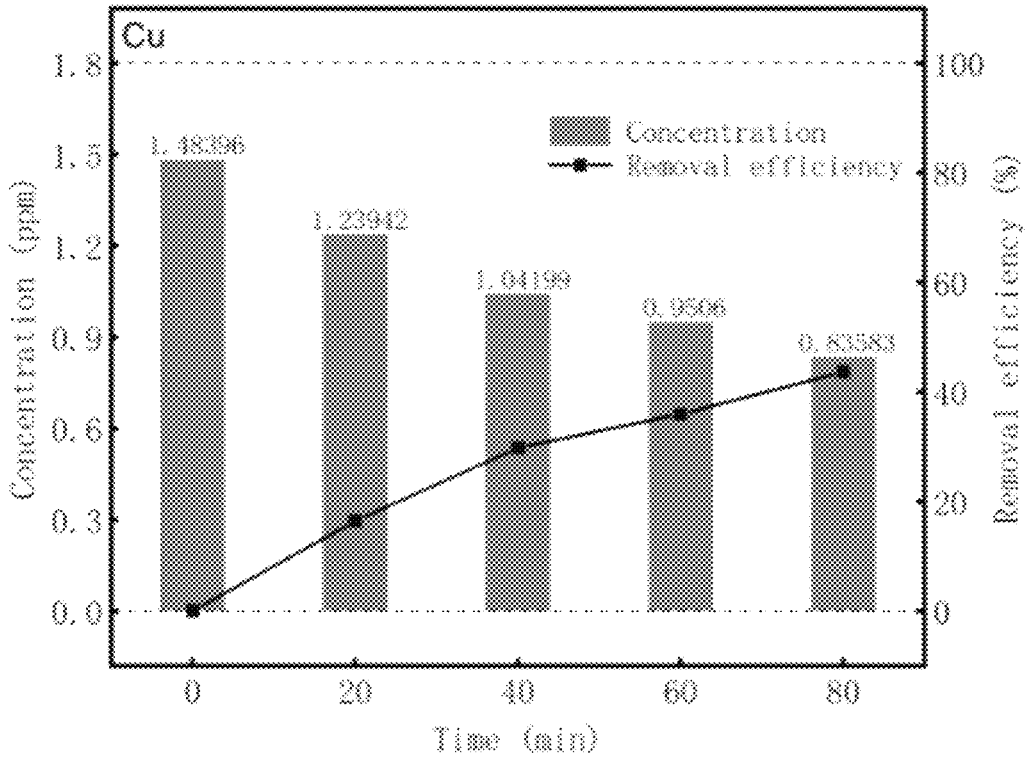
FIG. 4*e* shows a change in concentration of metal ions at different treatment times in the copper extraction from the aqueous solution through electrocoagulation in the examples.

For different applied bath voltages, as shown in FIG. 3, the extraction efficiencies of gold were all greater than 99.0%. For example, when the voltage of the electrolytic cell was controlled to 0.5V, for the gold-containing aqueous solution with an initial concentration of 2.30 mg/L after electrocoagulation reaction for 32 minutes, the gold concentration decreased to 0.0014 mg/L. It can be seen that gold extraction from an aqueous solution through an electrocoagulation process has the characteristics of wide applicable pH range, high efficiency and low operating costs.

Experimental Example (2): Comparison of gold and other metals in extraction. Extraction of magnesium, zinc, nickel, manganese and copper from aqueous solutions was performed through electrocoagulation reaction based on the system of Example 10. The reaction system was similar to that of Example 10 except for addition of a magnesium ion standard solution (commercially available from Bena Biological Testing Co., Ltd., Henan, China), a zinc ion standard solution (commercially available from Bena Biological Testing Co., Ltd., Henan, China), a nickel ion standard solution Test Results: Table 1 Different parameters for gold extraction through electrocoagulation.

| | | | | parameters | | | |
|---|---|---|---|---|---|---|---|
| Examples | pH of aqueous solution | Measured concentration of gold in aqueous solution (mg/L) | Applied voltage (V) | Concentration of gold in aqueous solution after treatment for 8min (mg/L) | Concentration of gold in aqueous solution after treatment for 16min (mg/L) | Concentration of gold in aqueous solution after treatment for 24min (mg/L) | Concentration of gold in aqueous solution after treatment for 32min (mg/L) |
| Ex. 1 | 3.0 | 2.298 | 2.0 | 0.00291 | 0.00181 | 0.000366 | 0.000305 |
| Ex. 2 | 5.0 | 2.298 | 2.0 | 0.00166 | 0.000616 | 0.000391 | 0.000219 |
| Ex. 3 | 6.5 | 2.298 | 2.0 | 0.005438 | 0.00131 | 0.000217 | 0.000105 |
| Ex. 4 | 8.0 | 2.298 | 2.0 | 0.00337 | 0.000445 | 0.000238 | 0.000217 |
| Ex. 5 | 10.0 | 2.298 | 2.0 | 0.00238 | 0.000427 | 0.000314 | 0.000269 |
| Ex. 6 | 6.5 | 1.396 | 2.0 | 0.0429 | 0.00354 | 0.00567 | 0.00024 |
| Ex. 7 | 6.5 | 2.298 | 2.0 | 0.005438 | 0.00131 | 0.000217 | 0.000105 |
| Ex. 8 | 6.5 | 5.568 | 2.0 | 0.0135 | 0.00421 | 0.00315 | 0.00126 |
| Ex. 9 | 6.5 | 12.051 | 2.0 | 0.00621 | 0.00322 | 0.00215 | 0.00193 |
| Ex. 10 | 6.5 | 2.298 | 0.5 | 0.158 | 0.0130 | 0.0349 | 0.00137 |
| Ex. 11 | 6.5 | 2.298 | 1.0 | 0.158 | 0.0129 | 0.00349 | 0.00108 |
| Ex. 12 | 6.5 | 2.298 | 2.0 | 0.0544 | 0.00131 | 0.000691 | 0.000596 |
| Ex. 13 | 6.5 | 2.298 | 4.0 | 0.00322 | 0.00128 | 0.000177 | 0.0000 |

From Table 1 and FIG. 1, which show change of gold concentrations in the aqueous solutions under the various pH conditions for different treatment times, it can be seen that in a wide pH range (strong acidity and strong alkalinity), the electrocoagulation method can achieve high-efficiency gold capture and extraction in the aqueous solution, and the extraction efficiencies were all greater than 99.98% (about 100%); for the gold-containing aqueous solution with an initial concentration of 2.30 mg/L, the gold concentration after treatment was 0.002-0.0004 mg/L, and the residual gold concentration was extremely low.

Figure 2:
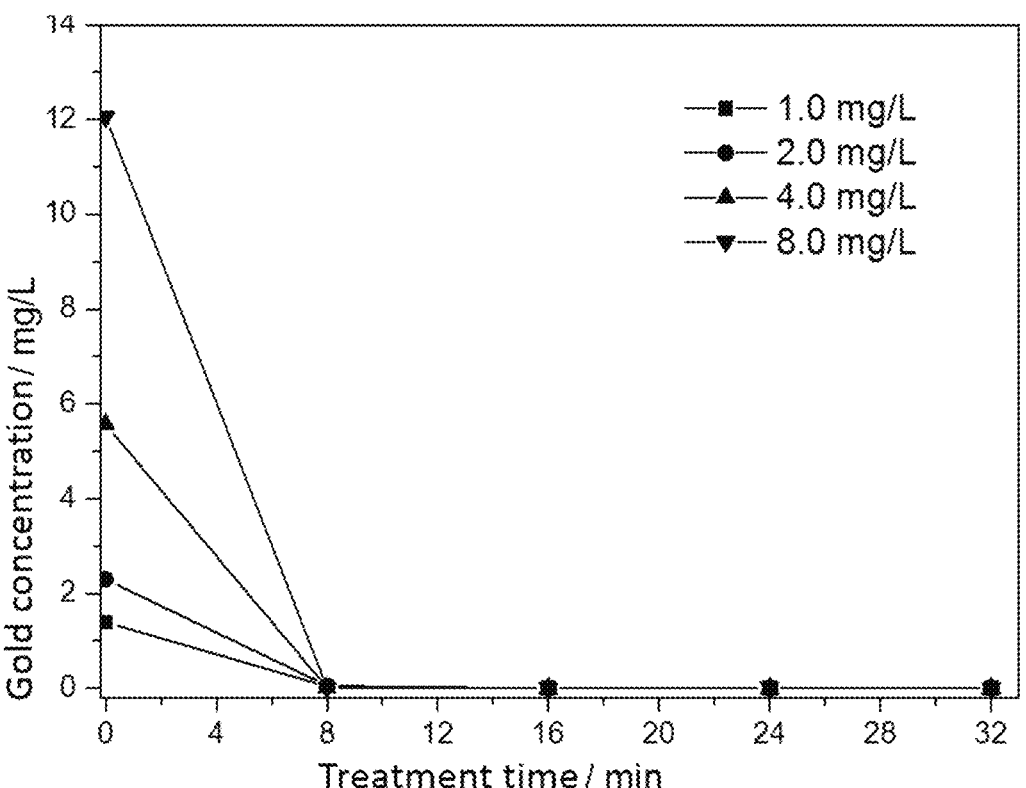
FIG. 2 shows a change in gold concentration as the initial gold concentrations differ in the gold extraction from the aqueous solution through electrocoagulation in the examples.

From FIG. 2, which shows change of gold concentrations after gold extraction through electrocoagulation from aqueous solutions with different initial gold concentrations, it can be seen that for the gold-containing aqueous solutions with initial gold concentrations of 1.0, 2.0, 4.0, and 8.0 mg/L under the conditions of an applied bath voltage of 2.0 V and pH=6.5, the gold extraction efficiencies were all greater than 99%; when the initial gold concentration was 12.05 mg/L, the gold concentration in the aqueous solution after electrocoagulation reaction for 32 minutes was as low as 0.0019. Therefore, high-efficiency extraction for high-concentration gold can be achieved even under low voltage conditions.

(commercially available from Bena Biological Testing Co., Ltd., Henan, China), a manganese ion standard solution (commercially available from Bena Biological Testing Co., Ltd., Henan, China), or a copper ion standard solution (commercially available from Bena Biological Testing Co., Ltd., Henan, China) to the aqueous solutions. The initial concentrations (measured concentrations) of magnesium ions, zinc ions, nickel ions, manganese ions, and copper ions in the aqueous solutions are shown in FIGS. 4a to 4e.

Sample pretreatment: the reaction solutions after the electrocoagulation reaction of the above reaction step (1) were each sampled and filtered through a 0.22 μm water-based filter membrane, and the filtrate was collected for measurement.

Testing method: The concentration of metal ions in the aqueous solution was measured using a laser ablation-inductively coupled plasma mass spectrometer (LA-ICP-MS, Agilent 7900, Agilent, USA).

Test Results: From FIGS. 4a to 4e, it can be seen that the extraction efficiencies of magnesium, zinc, nickel, manganese and copper were low, which is much lower than that of gold. This result shows that the extraction of gold using the method of the present disclosure is specific, and the interference by other metals can be avoided during the extraction process.

Experimental Example (3): Gold content and analysis and characterization of gold form in flocculent precipitate. Au content and form analysis were carried out on the precipitated iron sludge after gold extraction in step (2) of Example 10.

Testing method: Au content in the precipitated iron sludge was detected using energy dispersive spectrometer (EDS,) (Flash 6110, BRUKER) coupled with scanning electron microscope (SEM, QUANTA FEG 450, FEI). The valence of Au in the precipitated iron sludge was detected using X-ray photoelectron spectroscopy (XPS, Escalab 250Xi, Thermo Fisher Scientific) under the parameters including an excitation light source of Al Ka, a test pressure less than 10-7 Pa, a power of 120 W, a narrow-band pass energy of 30 eV with a step size of 0.1 eV, and a full-band pass energy of 150 eV with a step size of 1.0 eV.

Figure 5A:
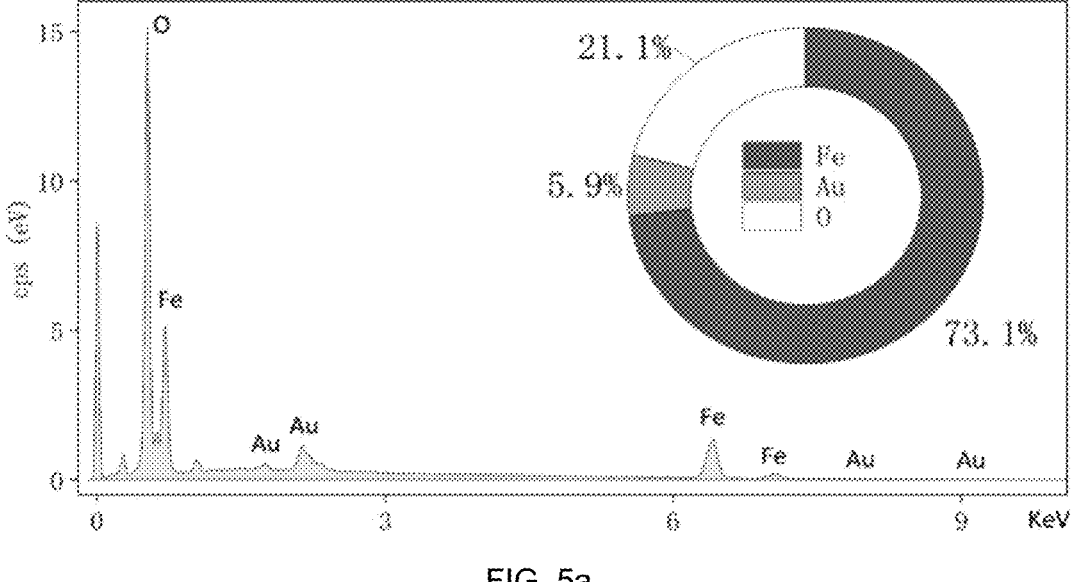
FIG. 5*a* shows X-ray energy spectrum analysis of gold element content in the precipitated iron sludge during the gold extraction through electrocoagulation in the examples.
Figure 5B:
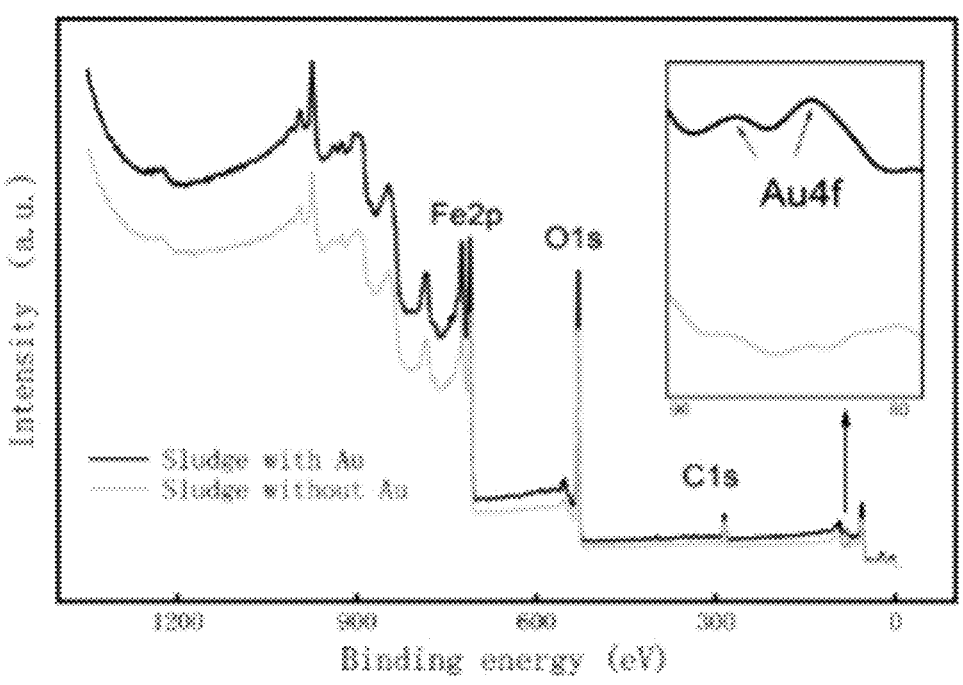
FIG. 5*b* shows full spectrum of X-ray photoelectron spectroscopy analysis of the precipitated iron sludge during the gold extraction through electrocoagulation in the examples.
Figure 5C:
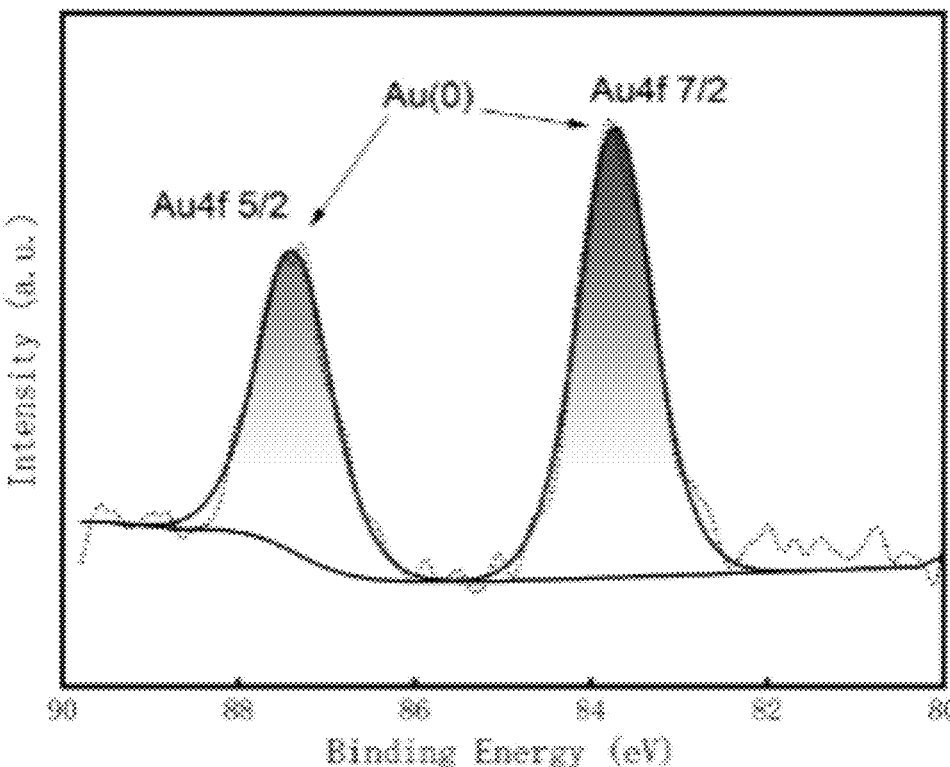
FIG. 5*c* shows a narrow-scanning spectrum of gold in X-ray photoelectron spectroscopy analysis of the precipitated iron sludge during the gold extraction through electrocoagulation in the examples.

Test Results: The results are shown in FIGS. 5a to 5c. FIG. 5a shows an EDS energy spectrum of the precipitated iron sludge, FIG. 5b shows an XPS broad spectrum of the precipitated iron sludge, and FIG. 5c shows an XPS narrow spectrum of the precipitated iron sludge in the Au4f region. It can be seen from FIG. 5a that the gold content in the precipitated iron sludge was as high as 5.9%, which is significant for recovery. In this case, gold has a chemical valence of 0, meaning that gold exists as an elemental form.

Experimental Example (4): The surface of the nanofiltration membrane after cut-off treatment of gold in step (3) of Example 10 was characterized by elemental analysis.

Testing method: the element contents on the surface of the nanofiltration membrane after cut-off treatment of gold were detected using energy dispersive spectrometer (EDS, XFlash 6110, BRUKER) coupled with scanning electron microscope (SEM, QUANTA FEG 450, FEI).

Figure 6:
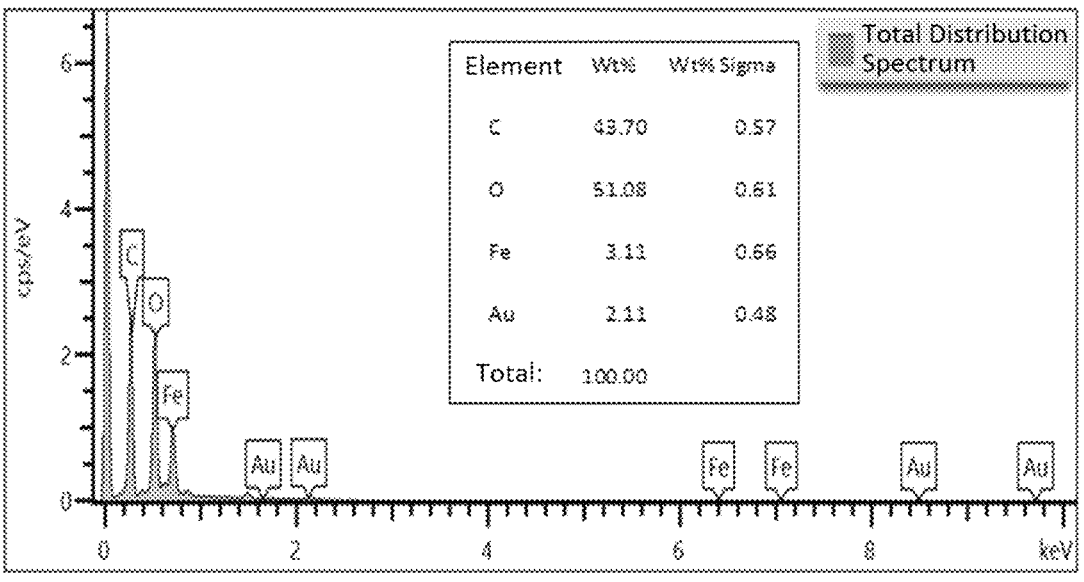
FIG. 6 shows elemental analysis of the content of gold nanoparticles on the nanofiltration membrane in the examples.
Figure 7:
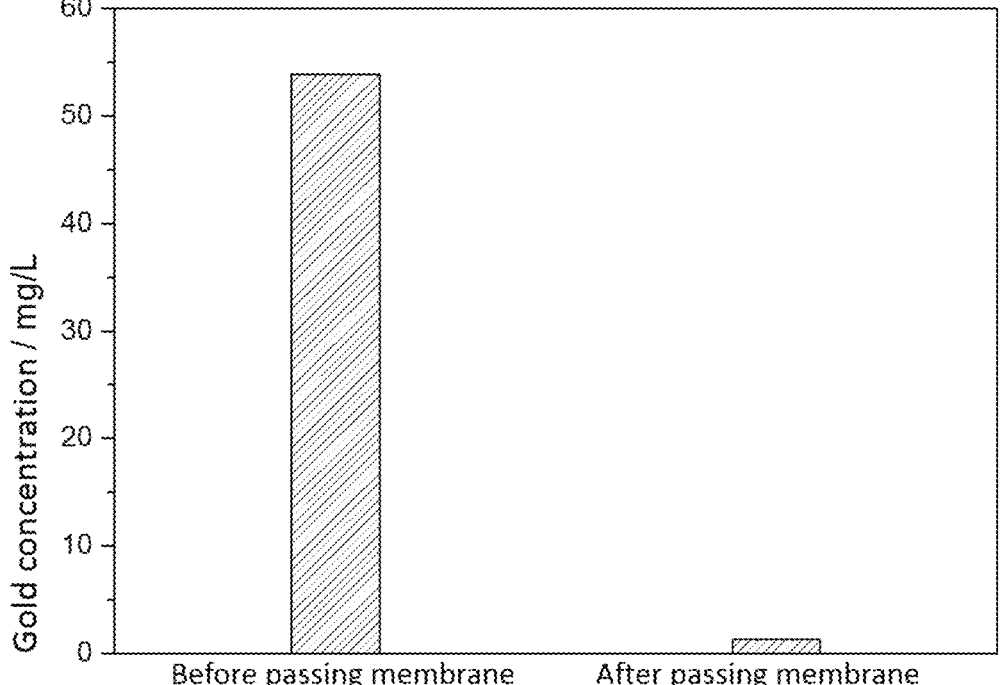
FIG. 7 shows the gold concentrations before and after nanofiltration separation of the solution after pickling the iron sludge in the examples.

Test Results: The result is shown in FIG. 6. It can be seen that Au and Fe elements were deposited on the surface of the filter membrane, in addition to the constituent elements of the organic filter membrane such as C and O. The gold content was as high as 2.11%. Elemental gold can be obtained after simple washing with water. The solution obtained after pickling the iron sludge before and after passing through the nanofiltration membrane was decomposed using aqua regia. The gold concentration was 53.87 mg/L before passing the filter membrane and 1.32 mg/L after passing the filter membrane. As shown in FIG. 7, the gold cut-off rate was 97.5%. The comprehensive gold recovery rate of this method was as high as 97%.

The descriptions of the above examples are only used to help understand the technical solutions and core concept of the present disclosure. It should be noted that those skilled in the art can make some improvements and modifications to the present disclosure without departing from the principles of the present disclosure. These improvements and modifications also fall within the protection scope of the claims of the present disclosure.

INDUSTRIAL APPLICABILITY

The method for extraction and recovery of gold provided in the present disclosure has the characteristics of high gold extraction efficiency (about 100%), low cost, simple process, good stability, environmental protection, and can also recover high-grade elemental gold (with a comprehensive recovery rate greater than 95%). The method is of an important significance for technical guidance and practical engineering application for the extraction and recovery of gold in various gold smelting and extraction processes.

What is claimed is:

1. A method for extracting and recovering gold from an aqueous solution, the method comprising:
   (1) gold extraction from an aqueous solution through electrocoagulation, comprising:
      extracting gold from an aqueous solution through electrocoagulation using a sodium salt as an electrolyte under a direct-current stabilized voltage supply in an electrolytic cell;
   (2) pickling and liquefaction of a precipitated iron sludge, comprising:
      dissolving a resulting precipitate in nitric acid under ultrasonication treatment; and
   (3) separation and recovery of gold through a nanofiltration membrane system, comprising:
      subjecting a resulting solution after pickling the precipitated iron sludge to cut-off treatment using a nanofiltration membrane to separate nano-sized elemental gold from the solution.

2. A method for extracting and recovering gold, the method comprising:
   (1) performing gold extraction through an electrocoagulation reaction in a water-based solution containing gold using an electrolytic cell and an electrolyte under a direct-current stabilized voltage supply, to obtain a precipitate;
   (2) performing acid hydrolysis on a resulting precipitate in an acid to obtain a solution after pickling; and
   (3) filtering and cutting off the solution after pickling to separate nano-sized elemental gold from the solution.

3. The method for extracting and recovering according to claim 1, wherein
   the electrolytic cell in step (1) comprises an anode and a cathode, and the anode is made of an anode material that can dissolve to release metal ions and produce electropositive colloidal oxides or hydroxides;
   optionally, the anode is made of a positive trivalent metal anode material; and
   optionally, the anode is an iron sheet.

4. The method for extracting and recovering according to claim 1, wherein
   an anode in step (1) is an iron sheet, which undergoes an electrocoagulation reaction to generate an iron hydroxide so as to achieve capture and reduction of gold; and
   a cathode in step (1) is selected from any one of titanium plates, graphite, stainless steel, and copper sheets.

5. The method for extracting and recovering according to claim 2, wherein
   the electrolyte is selected from any one of sodium salts, magnesium salts, calcium salts, and potassium salts.

6. The method for extracting and recovering according to claim 1, wherein
   the electrolyte in step (1) is selected from any one of $Na_2SO_4$, NaCl, $NaNO_3$, and $Na_2CO_3$.

7. The method for extracting and recovering according to claim 1, wherein
   the electrolyte is $Na_2SO_4$, and a mass concentration of the electrolyte is 3.0%.

8. The method for extracting and recovering according to claim 1, wherein
   the electrolyte is NaCl, $NaNO_3$, or $Na_2CO_3$, and a mass concentration of the electrolyte is 0.5%-5.0%.

9. The method for extracting and recovering according to claim 1, wherein an applied voltage for the electrolytic cell in step (1) is 0.5-4.0V.

10. The method for extracting and recovering according to claim 1, wherein a pH range of the aqueous solution in step (1) is 3.0-10.0.

11. The method for extracting and recovering according to claim 2, wherein the acid is an acid with a pH less than 2; and optionally, a concentration of the acid ranges from 1.0 mol/L to 8.0 mol/L.

12. The method for extracting and recovering according to claim 1, wherein a concentration of the nitric acid in step (2) ranges from 3.0 mol/L to 6.0 mol/L; and a solid-liquid ratio of the precipitate and the nitric acid is 1:500-1:50.

13. The method for extracting and recovering according to claim 2, wherein step (2) further comprises stirring or ultrasonication during the acid hydrolysis.

14. The method for extracting and recovering according to claim 1, wherein a temperature of the ultrasonication treatment in step (2) is 50° C.-80° C., and an ultrasonication washing time is 0.5 h or longer.

15. The method for extracting and recovering according to claim 1, wherein in step (3), a cut-off separation of nano-sized gold is carried out using a nanofiltration membrane, and the nanofiltration membrane has a pore size less than 4.0 nm.

16. The method for extracting and recovering according to claim 2, wherein the electrolytic cell in step (1) comprises an anode and a cathode, and the anode is made of an anode material that can dissolve to release metal ions and produce electropositive colloidal oxides or hydroxides;

optionally, the anode is made of a positive trivalent metal anode material; and optionally, the anode is an iron sheet.

17. The method for extracting and recovering according to claim 2, wherein an anode in step (1) is an iron sheet, which undergoes an electrocoagulation reaction to generate an iron hydroxide so as to achieve capture and reduction of gold; and a cathode in step (1) is selected from any one of titanium plates, graphite, stainless steel, and copper sheets.

18. The method for extracting and recovering according to claim 2, wherein the electrolyte is selected from any one of sodium salts, magnesium salts, calcium salts, and potassium salts.

19. The method for extracting and recovering according to claim 2, wherein the electrolyte in step (1) is selected from any one of $Na_2SO_4$, NaCl, $NaNO_3$, and $Na_2CO_3$.

20. The method for extracting and recovering according to claim 2, wherein the electrolyte is $Na_2SO_4$, and a mass concentration of the electrolyte is 3.0%.

* * * * *